US012761338B2

(12) United States Patent
Greverie et al.

(10) Patent No.: US 12,761,338 B2
(45) Date of Patent: Oct. 13, 2026

(54) LONG-RANGE OBJECT DETECTION SYSTEM

(71) Applicant: THALES, Courbevoie (FR)

(72) Inventors: Wilfried Greverie, Limours (FR); Jean-Jacques Maintoux, Limours (FR); Jean-Pierre Marcy, Limours (FR)

(73) Assignee: THALES, Courbevoie (FR)

(*) Notice: Subject to any disclaimer, the term of this patent is extended or adjusted under 35 U.S.C. 154(b) by 417 days.

(21) Appl. No.: 17/627,094

(22) PCT Filed: Jul. 17, 2020

(86) PCT No.: PCT/EP2020/070322
§ 371 (c)(1),
(2) Date: Jan. 13, 2022

(87) PCT Pub. No.: WO2021/009359
PCT Pub. Date: Jan. 21, 2021

(65) Prior Publication Data
US 2022/0252711 A1 Aug. 11, 2022

(30) Foreign Application Priority Data
Jul. 18, 2019 (FR) ........................................ 1908060

(51) Int. Cl.
*G01S 13/42* (2006.01)
*G01S 13/88* (2006.01)
*G01S 15/04* (2006.01)

(52) U.S. Cl.
CPC .............. *G01S 13/42* (2013.01); *G01S 13/88* (2013.01); *G01S 15/04* (2013.01)

(58) Field of Classification Search
None
See application file for complete search history.

(56) References Cited

U.S. PATENT DOCUMENTS 5,955,989 A * 9/1999 Li .......................... G01S 13/003 342/368
2017/0205536 A1* 7/2017 Musso .................... B64D 47/08

FOREIGN PATENT DOCUMENTS

DE 10 2009 046 499 A1 5/2010
DE 10 2017 114 223 A1 12/2018
(Continued)

OTHER PUBLICATIONS

Ma, et al., "Maritime Moving Target Indication Using Passive GNSS-Based Bistatic Radar", IEEE Transactions on Aerospace and Electronic Systems, vol. 54, Issue: 1, pp. 115-130, Feb. 2018.
(Continued)

*Primary Examiner* — Vladimir Magloire
*Assistant Examiner* — Brandon James Henson
(74) *Attorney, Agent, or Firm* — BakerHostetler

(57) ABSTRACT

A three-dimensional object detection system includes a transmission device configured so as to transmit signals using a colored transmission method in a first plane, a reception device comprising at least two sensors arranged in a second plane perpendicular to the first plane, and processing means for processing the transmitted and received signals, wherein the reception device is raised with respect to the transmission device, and wherein the processing means are configured so as to detect the presence of objects: in the first plane based on the signals received from at least one of the sensors using the color of the transmitted signal, in the second plane based on the signals received from at least two of the sensors. The method for determining the presence of objects and for estimating their associated direction and distance is also provided.

17 Claims, 7 Drawing Sheets

(56) References Cited

FOREIGN PATENT DOCUMENTS

| | | | | | |
|---|---|---|---|---|---|
| EP | 2296007 | A1 * | 3/2011 | ........... | G01S 13/424 |
| WO | WO-2013045232 | A1 * | 4/2013 | ........... | G01S 13/003 |

OTHER PUBLICATIONS

Wang, et al., "Co-frequency Interference Suppression for Aerostat Passive Bistatic Radar", Chinese Journal of Electronics, vol. 27(3), pp. 658-666, 2018.

Chevalier, et al., "Emission coloree pour antenne active radar" [Colored transmission for active radar antenna], X Revue de I Electricité et de I Electronique, REE No. 03, pp. 48-52, Mar. 2005.

* cited by examiner

LONG-RANGE OBJECT DETECTION SYSTEM

CROSS-REFERENCE TO RELATED APPLICATIONS

This application is a National Stage of International patent application PCT/EP2020/070322, filed on Jul. 17, 2020, which claims priority to foreign French patent application No. FR 1908060, filed on Jul. 18, 2019, the disclosures of which are incorporated by reference in their entirety.

FIEDL OF THE INVENTION

The present invention lies in the field of object detection systems, or radars. It relates in particular to detection systems used for three-dimensional (3D) localization.

BACKGROUND

Armed forces deployed in operational theaters are faced with increasingly diverse short-range threats (rockets, mortars, missiles, drones, small planes, vehicles, infantry, etc.). The surveillance means that are currently available are generally suited to the detection and localization of one particular type of threat, notably in terms of detection distance capability.

When threats are varied, it is often necessary to deploy multiple types of heterogeneous systems in parallel to deal with them, thereby increasing the logistical and human footprint during implementation.

These systems are often short-range (two-dimensional or three-dimensional) radars whose aerial is a few meters above the ground. At present, there are no single-radar solutions that take into account the diversity of threats.

If the threats evolve over time, for example by becoming increasingly small (reduced RCS) or by needing to be detected further away (increased range) in order to improve detection notice, then it is necessary to evolve/change the systems in place.

There are only a few solutions for improving the range performance of a radar. They consist in:

- either increasing the transmission power and the size of the antenna of the radar. These solutions quickly lead to complex systems that have a direct impact on the cost of the equipment and its logistical footprint. By way of example, doubling the antenna surface or the transmission power (+3 dB) increases the range of the radar system by only 20% with respect to a reference target, the range of a radar evolving in line with distance with a law of $d^4$, where d is distance;
- or increasing radar visibility, by installing the radar:
  - on a high point, such as for example a geographical point, but such a point is not necessarily available,
  - at the top of a tall mast or pylon, but the weight of the radar system places significant constraints on the structure of such a mast, its deployment and its maximum height,
  - under an airborne device such as a balloon filled with a lightweight gas such as helium. In this case, the dimensioning of the balloon is linked directly to the payload to be carried. By way of example, a 35 kg load requires a balloon a few meters long, while a 200 kg load requires a large balloon (more than 25 meters). The implementation is therefore complex as soon as the mass of the radar is greater than a few hundred kilograms, a large balloon having significant acquisition and deployment costs. In addition, the energy consumption and the cooling of these devices require power supply lines with a large cross section, the weight of which may lead to the permissible load being exceeded. The same applies when the airborne device is of a different nature, such as for example a drone.

SUMMARY OF THE INVENTION

One aim of the invention is therefore to propose a detection device having an extended range with regard to rockets, or other types of missiles, but also a simultaneous detection and 3D localization capability with regard to aerial threats such as drones, helicopters and microlights, and/or moving vehicles and/or humans, while at the same time ensuring that the cost of the device, its weight, its implementation complexity and its deployment complexity are lower than for known solutions.

FIG. 1 very summarily shows the various components of a detection device. This comprises a radar processing device 101 responsible firstly for generating or playing a radar signal, and secondly for receiving one or more echo signals, and for implementing signal processing algorithms in order to locate objects in a 2-dimensional (2D) or three-dimensional (3D) environment.

The radar processing device is connected to a transmission device 102 configured so as to receive, from the radar processing device, a signal to be transmitted, and to transmit it in accordance with a given configuration, comprising a transmission power, transmission times, a transmission frequency and/or a transmission direction. The transmission device 102 therefore comprises a digital-to-analog converter (DAC) in order to convert the signals that are transmitted thereto by the radar processing device when these are digital, a radiofrequency chain for amplifying and transposing the signal onto a carrier frequency when this is received in baseband or onto an intermediate frequency, and one or more transmit antennas, such as for example an omnidirectional antenna such as a dipole or a directional antenna such as a patch antenna or an array antenna.

The radar processing device 101 receives signals from a signal reception device 103. This is configured so as to receive signals echoing the signals transmitted on one or more sensors. Each sensor comprises at least one radiating element, which is omnidirectional in one plane or directional depending on the configuration. These sensors may be networked to form a directional antenna. The signal reception device 103 is configured so as to acquire the signals received from one or more sensors according to given configuration parameters, such as for example reception times, a reception frequency and/or a reception direction, and to transmit them to the radar processing device for analysis. Each sensor is connected to a radiofrequency chain configured so as to filter and amplify the received signal, and to transpose it into baseband or an intermediate frequency when necessary. If the signal transmitted to the radar processing device is a digital signal, each sensor is also connected to an analog-to-digital signal converter (ADC). As an alternative, the radiofrequency chain and/or the analog-to-digital converter may be integrated into the sensor.

The various elements of the detection system may be collocated or grouped together in a single item of equipment: reference is then made to a monostatic radar. They may also be broken down into multiple separate items of equipment: reference is then made to a bistatic radar when transmission and reception are separate. Collocated radars generally use the same antennas to transmit and receive signals, in order to reduce the size, weight and cost of the equipment.

The radar processing device 101 is a computing device, preferably a digital computing device, generally in the form of software embedded in a component such as a processor, a digital signal processor (DSP), or a specialized circuit such as an ASIC (application-specific integrated circuit) or an FPGA (field-programmable gate array).

Based on the signals transmitted by the transmission device and the signals received from the reception device, the radar processing device detects and tracks targets present in the space to be monitored. These are characterized by a distance, an azimuth and an elevation, and possibly by other parameters such as for example their Doppler speed. Many methods are known from the prior art for this purpose. These include phase or amplitude interferometry processing operations, such as for example Adcock arrays, beamforming techniques, or what are known as high-resolution processing operations, such as for example the MUSIC (acronym for Multiple Signal Classification) algorithm.

These various methods place particular constraints on the number of radiating elements of the transmit and receive antennas 102 and 103, respectively, and on their arrangements: for example, an Adcock array requires multiple antennas spaced by a spacing proportional to the wavelength of the signals, and an array antenna comprises a plurality of radiating elements spaced by a distance proportional to the wavelength. The dimensioning of radar systems is therefore closely linked to the frequency of the signals that are used. In particular, low-frequency radars require large and highly spaced transmit and receive antennas, while high-frequency radars are more compact.

In addition, three-dimensional detection requires the implementation of a directional antenna able to move mechanically along two axes or of radiating elements distributed in two perpendicular planes.

In order to address the problems of the prior art, the invention describes a system for detecting the presence of objects and for estimating their direction and distance in three dimensions, comprising:

- a transmission device configured so as to transmit signals using a colored transmission method in a first plane,
- a reception device comprising at least two sensors arranged in a second plane perpendicular to the first plane, and
- processing means (230, 330) for processing the transmitted and received signals.

The processing means are configured so as to detect the presence of objects and estimate their direction and distance:

- in the first plane based on the signals received from at least one of the sensors of the reception device using the color of the transmitted signal,
- in the second plane based on the signals received from at least two of the sensors of the reception device.

The transmission device and the reception device are separate, the reception device being raised with respect to the transmission device.

Advantageously, and so as to allow detection over the whole of the first plane, each sensor comprises a radiating element that is omnidirectional in the first plane.

According to one embodiment, the first plane is a horizontal plane, wherein the sensors of the reception device are arranged in a vertical plane. Advantageously, the sensors of the reception device are then connected by a cable and suspended under an airborne device allowing them to be raised, such as an inflatable balloon or a drone. Advantageously, just one sensor is used to detect the presence of objects and estimate their direction and distance in the first plane, preferably the highest sensor.

According to another embodiment, the first plane is a vertical plane and the sensors of the reception device are arranged in a horizontal plane.

The sensors of the reception device may then be arranged in a row, the system furthermore having means for removing ambiguities regarding the position of the objects with respect to the sensors in the horizontal plane.

The sensors of the reception device may also be arranged so as to form a triangle, the detection of the presence of objects and the estimation of their direction and distance in the horizontal plane being performed for each branch of the triangle, respectively, and then combined so as to remove ambiguities regarding the position of the objects with respect to the sensors in the horizontal plane.

Advantageously, the sensors of the reception device are connected to the processing means by a fiber-optic link, the sensors furthermore comprising means for converting the received signals to optical signals. Using a fiber-optic link makes it possible to reduce the mass of the cable for transmitting the signals acquired by the sensors of the reception equipment, and therefore the mass of the whole item of reception equipment.

The detection of the presence of objects and the estimation of their direction and distance in the second plane may be performed by implementing an interferometry method or a high-resolution processing operation on the signals received from the at least two sensors of the receive antenna. As an alternative, it may be implemented by utilizing the directivity of an array antenna formed by the at least two sensors of the receive antenna.

The invention also describes a method for implementing detection of the presence of objects and for estimating their direction and distance in three dimensions in a detection system comprising:

- a transmission device configured so as to transmit signals using a colored transmission method in a first plane,
- a reception device comprising at least two sensors arranged in a second plane perpendicular to the first plane, and
- processing means for processing the transmitted and received signals.

The method comprises the steps of:

- transmitting a signal using a colored transmission method in a first plane,
- receiving signals from at least two sensors arranged in a second plane perpendicular to the first plane, and
- implementing a method for determining the presence of objects and for estimating their direction and distance in the first plane by utilizing the color properties of the signal received by at least one of the sensors, and in the second plane based on the signals received from at least two of the sensors.

BRIEF DESCRIPTION OF THE DRAWINGS

The invention will be better understood and other features and advantages will become more clearly apparent upon reading the following non-limiting description, and by virtue of the appended figures, in which.

Hereinafter, when the same references are used in different figures, they denote the same elements.

DETAILED DESCRIPTION

In order to address the problems posed by the devices of the prior art, the invention finds that the transmission device has a much greater weight than the reception device. This is due in particular to the mandatory presence of high-power amplifiers, power electronics elements such as high-capacitance capacitors, elements required to cool the amplifiers, and power supply lines with a large cross section required to supply power to the assembly. The invention proposes to separate the transmission portion from the reception portion, in the manner of a bistatic radar, and to raise the reception device as a priority. In this way, the mass of the load to be raised is reduced to a significant proportion, thereby simplifying the implementation of the system, and making it possible to improve the propagation conditions for the reception portion at a low cost. In addition, raising the receive antenna makes it possible to significantly limit interference fringes and losses for low-altitude targets.

To allow three-dimensional object localization while at the same time reducing implementation complexity, the invention proposes to use a colored signal transmission method, also known by the name simultaneous multiple transmission. This method, cited for example in the article "Emission colorée pour antenne active radar" [Colored transmission for active radar antenna], François Le Chevalier, Laurent Savy, REE No. 03, Revue de l'Electricité et de l'Electronique [Electricity and Electronics Review], March 2005, pages 48-52, consists in dividing the space in which the transmit antenna transmits into subarrays using MIMO (acronym for "multiple input multiple output") or MISO (acronym for "multiple input single output") processing methods. By shaping the signal transmitted from the various radiating elements of the transmit antenna, different signals are sent on each of the subarrays, thus achieving spatio-temporal coding of the space. The signals then combine in space according to phase groups or delays that depend on the targeted direction. This results in an overall signal that differs from one direction to another. At reception, to detect a signal coming from a given direction, the processing performs filtering matched to the signal associated with this direction. This filter is not matched to the signals coming from the other directions, since the signal is no longer the same in these other directions.

European patent application EP 2 296 007 A1 describes an agile beam radar in which detection is performed in one plane based on the color of the signals, and in the orthogonal plane through beamforming.

Figure 1:
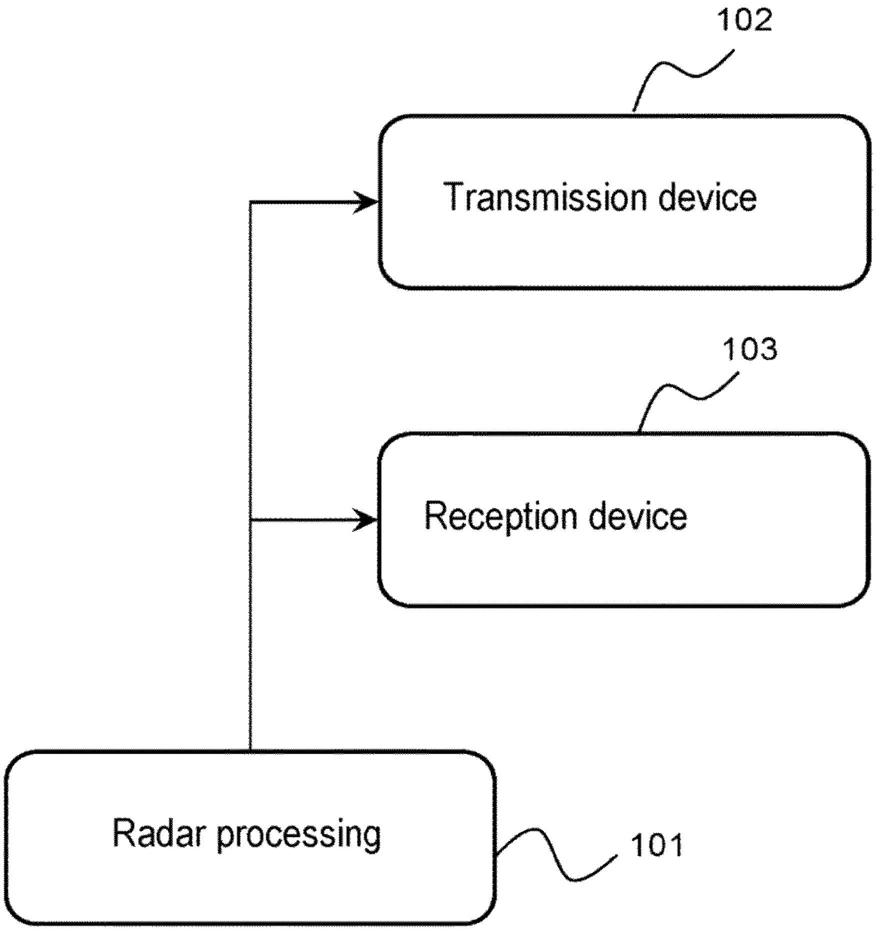
FIG. 1 shows a system for detecting the presence of objects and for estimating their direction and distance, or radar, as known from the prior art.
Figure 2:
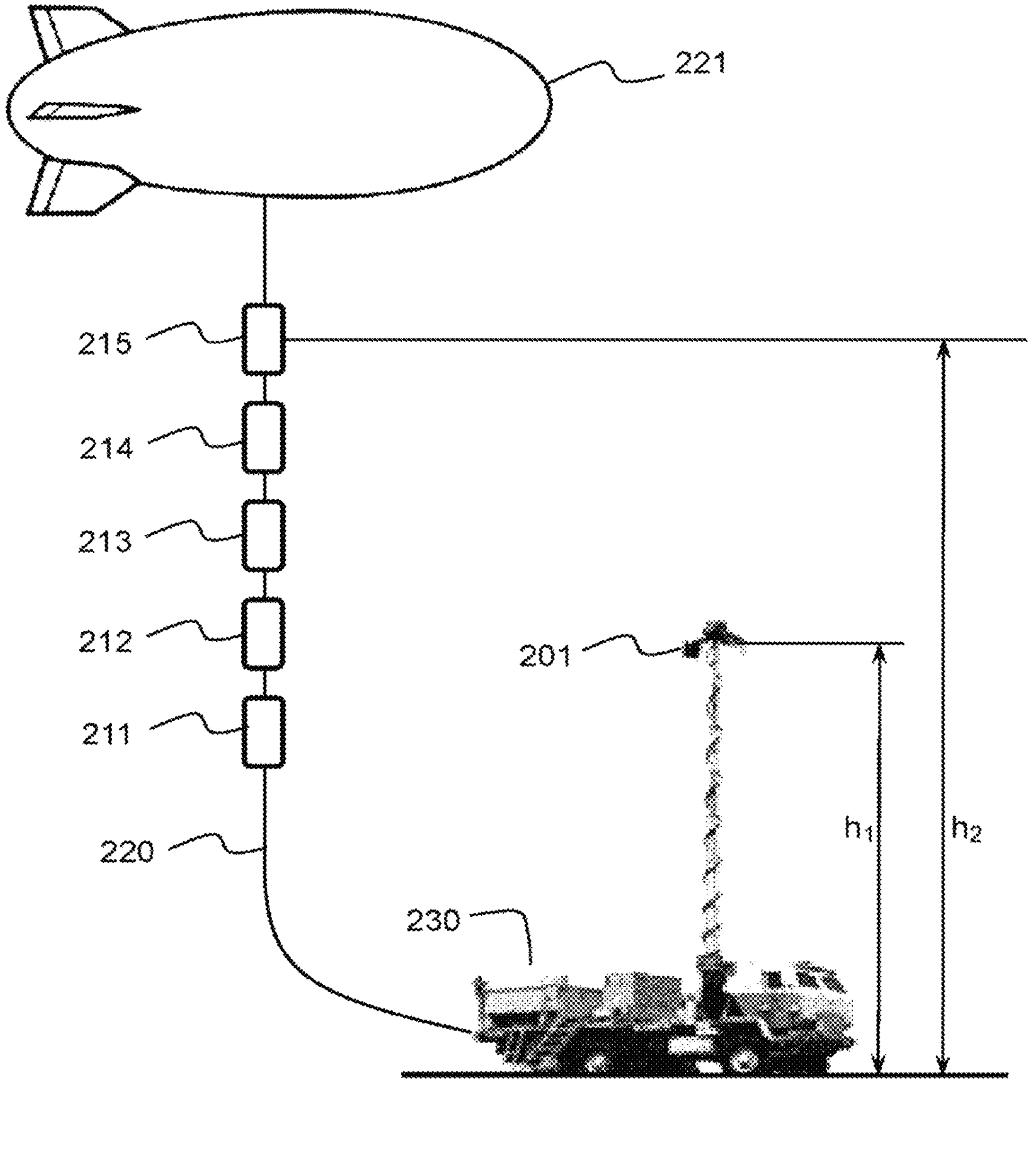
FIG. 2 shows a first embodiment of a system for detecting the presence of objects and for estimating their direction and distance according to the invention.

FIG. 2 shows a first embodiment of a system for detecting the presence of objects and for estimating their direction and distance in 3D according to the invention. As is obvious to those skilled in the art, the detection system according to the invention also makes it possible to detect other features of the objects, such as for example their speed. In this embodiment, the transmission device 201 is arranged at the top of a telescopic mast that is self-supported by a vehicle, but it could also be installed directly on the ground. The height $h_1$ of the telescopic mast is constrained by the significant weight of the transmission device.

The transmission device is configured so as to transmit a signal in a colored manner in the horizontal plane. This may be achieved using a directional antenna transmitting a colored signal whose direction and color vary over time, or using an array antenna comprising multiple radiating elements each transmitting a signal. The transmissions may be directional or omnidirectional, in the horizontal plane and/or in the vertical plane. The transmission device is connected to a radar processing device 230, which, in the example, is on board the carrier vehicle, but the arrangement of which is unimportant.

The reception device comprises multiple sensors 211 to 215 separate from the transmission device, arranged in a row and vertically, thus together forming a receive array antenna. The sensors are connected, by a cable, to a high point such as an inflatable balloon 221 or to any other element for suspending the reception device (drone, crane, pylon, etc.), such that they are arranged between the ground and the high point. The sensors of the reception device are furthermore connected to a radar processing device 230 by a cable 220 that carries signals and power supplies. This cable may be the same as the one holding the sensors and/or the one keeping the balloon 221 in position. The solution in which the cable used to transmit the signals is different from the cable holding the balloon 221 is however preferable in order to facilitate the deployment and the withdrawal of the device. Due to the low weight of the sensors, the height $h_2$ of the highest sensor may be greater or much greater than the height $h_1$ at which the transmission device 201 is fixed. With one aim of the invention being to position the sensors of the reception device as high as possible in order to increase direct visibility and to reduce interference fringes caused by reflections on the ground, this aim is therefore achieved by virtue of the distinction between the transmission device and the reception device.

The sensors of the reception device 211 to 215 comprise radiating elements that are omnidirectional in the horizontal plane, such as for example vertically mounted dipole antennas, this making the equivalent antenna formed by the array of sensors omnidirectional in terms of azimuth and directional in terms of elevation. The sensors may also be directional if the purpose of the antenna is not to provide 360° surveillance in the horizontal plane. Advantageously, each sensor furthermore comprises a low-noise amplifier for boosting the level of the signal before it is transmitted to the radar processing device 230.

When the cable providing the link between the transmission device 201 and the radar processing device 230 carries a digital signal, the transmission device 201 comprises a digital-to-analog converter. Likewise, when the cable 220 providing the link between the sensors of the reception device 211 to 215 and the radar processing device 230 carries a digital signal, the sensors of the reception device each comprise an analog-to-digital converter. The radar processing device comprises the opposing converters.

Advantageously, the link connecting the sensors of the reception device to the radar processing device is an optical link. Using an optical fiber makes it possible to reduce the cross section and the mass of the cable 220. This solution is preferable to using a copper cable as it still makes it possible to lighten the device, and to position the sensors of the receive antenna as high as possible. It also makes it possible to facilitate the deployment/withdrawal of the reception device. In this case, the sensors also each have converters for converting the received analog or digital signals to optical signals, for transmitting the signals acquired by the radiating elements to the radar processing device, and, when they comprise a low-noise amplifier, an optical to electrical energy converter for supplying power thereto. The radar processing device comprises the opposing converters.

The advantages of the described embodiment over the prior art stem from the separation of the transmission elements and the reception elements. Since the mass of the reception device is low in comparison with that of the transmission device, it may be deployed at height much more easily than if it had been necessary to raise all of the transmission/reception equipment.

In this embodiment, the detection of the objects and the estimation of their azimuth, that is to say the determination of their direction and distance in a horizontal plane, are performed using the color properties of the transmitted signals. This determination is performed based on the signal received from one of the sensors of the reception device using methods known to those skilled in the art. Advantageously, the sensor selected for this purpose is the highest sensor, since this is the one for which the interference fringes are the smallest. Again advantageously, so as to provide gain for detection in the horizontal plane, this operation is performed on the signals received from multiple sensors of the reception device.

Estimating the azimuth of the detected objects using the color properties makes it possible to avoid having to arrange multiple sets of sensors in parallel to create an array antenna that is directional in the horizontal plane. In this way, the one-dimensional array antenna formed by the sensors makes it possible to implement 3D localization methods that are usually possible only using two-dimensional array antennas. Switching from two dimensions to one dimension therefore makes it possible to reduce the bulk, the cost and the complexity of deploying/withdrawing the device. This also makes it possible to have a larger antenna vertically than known devices at a constant weight.

The detection of the objects and the estimation of their elevation, that is to say the determination of their direction and distance in the vertical plane of the sensors 211 to 215 of the reception device, are performed by the radar processing device 230 based on the signals received from all of the sensors or from a selection of at least two sensors, using the directivity properties of the array antenna thus formed. The selection of sensors that are used may be made based on considerations relating to the operating frequency band, the spacing between the sensors, and the desired gain and directivity performance. To determine the position of the targets in the vertical plane, the multi-sensor antenna may be used as a directional array antenna scanning the vertical plane, by adjusting the phase and the amplitude of the signals received from each of the sensors and by recombining them so as to orient the antenna beam. Also, the signals received from at least two sensors may be utilized by an interferometry method or by a high-resolution processing operation.

In practice, the detection may first of all be performed in a first plane, for example in the horizontal plane, to determine the azimuth of the object, and then in a second plane, for example the vertical plane, to determine the elevation by considering the azimuth determined in the first plane. The detection may also be performed simultaneously in both planes, thereby making it possible to benefit from a processing gain that makes it possible to improve the precision of the measurement.

Ideally, the reception device is deployed over a length corresponding to multiple times the half-wavelength at the maximum frequency under consideration, or even several tens or hundreds of times, and comprises a large number of sensors. This is possible as the sensors used by the receive antenna do not comprise any power electronics and are therefore of very small size and weight. The receive antenna may then easily be positioned at very high heights using a reasonable-sized balloon 221, a crane, or any other device for attaching the receive antenna to a high point, and carry a large number of sensors.

The great height of the device makes it possible to considerably reduce interference fringes and losses for low-altitude targets in comparison with an item of transmission/reception equipment positioned at ground level or at the top of a telescopic mast. Since the weight of the cable 220 becomes a dimensioning factor when the height of the device increases, it may advantageously be reduced by being made of an optical fiber.

Using a large number of sensors in the reception device makes it possible to increase the gain of the equivalent antenna and to obtain a very high angular resolution in the vertical plane.

By way of example, the following table gives the length of the antenna as a function of the frequency and the number of reception sensors:

| | Frequency (MHz) | | | | |
|---|---|---|---|---|---|
| | 100 | 200 | 450 | 1200 | 3000 |
| Wavelength (m) | 3.00 | 1.50 | 0.67 | 0.25 | 0.10 |
| No. of sensors | 64 | 64 | 64 | 256 | 512 |
| Total antenna length (m) | 95 | 47 | 21 | 32 | 26 |

The implementation of a detection device operating at a frequency of 100 MHz and having 64 sensors therefore requires reception sensors arranged vertically over a height of 95 m, which is constrictive when it is implemented using conventional devices such as masts, but that the invention, which dissociates transmission and reception and uses the color of the signals to limit the number of sensors, makes it possible to implement at low cost using an airborne device.

Figure 3:
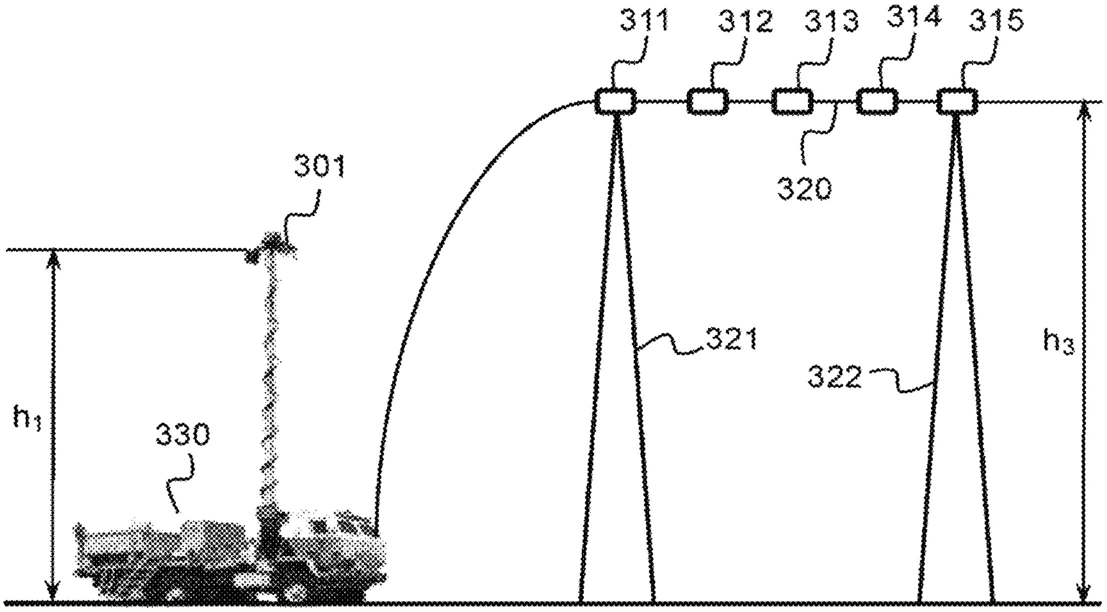
FIG. 3 shows a second embodiment of a system for detecting the presence of objects and for estimating their direction and distance according to the invention.

FIG. 3 shows a second embodiment of a system for detecting the presence of objects and for estimating their direction and distance in three dimensions according to the invention. Unlike the first embodiment, the antenna formed by the reception sensors is not arranged in the vertical plane, but in the horizontal plane.

The transmission device 301 is arranged at the top of a telescopic mast that is self-supported by a vehicle, but could be installed directly on the ground. The height $h_1$ of the telescopic mast is constrained by the significant weight of the transmission device. The transmission device comprises multiple radiating elements and is configured so as to transmit a signal in a colored manner in the vertical plane. This may be achieved using a directional antenna transmitting a colored signal whose direction and color vary over time, or using an array antenna comprising multiple radiating elements each transmitting a signal. The antenna beam may be directional or omnidirectional, in the horizontal plane and/or in the vertical plane. It is connected to a radar processing device 330.

The reception device comprises multiple sensors 311 to separate from the transmission device, arranged in a row and horizontally, thereby making the array antenna formed by the array of sensors omnidirectional in terms of elevation and directional in terms of azimuth when the sensors that are used are omnidirectional in the vertical plane. The sensors of the reception device are connected by a cable, which keeps them in position. In this embodiment, the cable is stretched between at least two pylons 321 and 322, such that the sensors are placed at a height $h_3$, but they could equally each be arranged at the top of a pylon or a mast. The sensors of the reception device are connected to the radar processing device 330 by a cable 320 that carries signals and power supplies. This cable may be the same as the one holding the sensors, or be an independent cable. As an alternative, each sensor may be connected independently to the device 330. Due to the low weight of the sensors, the height $h_3$ at which they are arranged may be greater than the height $h_1$ of the transmission device 301. With one aim of the invention being to position the sensors as high as possible in order to increase direct visibility and to reduce interference fringes caused by reflections on the ground, this aim is therefore achieved by virtue of the differentiated processing of the transmission device and the reception device.

The sensors 311 to 315 of the reception device comprise radiating elements that are omnidirectional in the vertical plane, such as for example horizontally mounted dipole antennas. The sensors may also be directional if the purpose of the antenna is not to provide 360° surveillance in the vertical plane. Advantageously, each sensor furthermore comprises a low-noise amplifier for boosting the level of the signal before it is transmitted to the radar processing device 330.

When the cable providing the link between the transmission device 301 and the radar processing device carries a digital signal, the transmission device 301 comprises a digital-to-analog converter. Likewise, when the cable 320 providing the link between the sensors 311 to 315 of the reception device and the radar processing device 330 carries a digital signal, the sensors each comprise an analog-to-digital converter. The radar processing device comprises the opposing converters.

Advantageously, the link connecting the sensors of the reception device to the radar processing device is an optical link. Using an optical fiber makes it possible to reduce the cross section and the mass of the cable 320. This solution is preferable to using a copper cable as it still makes it possible to lighten the device, and to position the sensors of the receive antenna as high as possible. It also makes it possible to facilitate the deployment/withdrawal of the reception device. In this case, the sensors of the reception device each have converters for converting the received analog or digital signals to optical signals, for transmitting the signals acquired by the radiating elements to the radar processing device, and, when they comprise a low-noise amplifier, a converter for converting optical energy supplied by the radar processing device 330 to electrical energy for supplying power thereto. The radar processing device 330 comprises the opposing converters.

In this embodiment, the detection of the objects and the estimation of their azimuth, that is to say the determination of their direction and distance in the horizontal plane of the sensors 311 to 315 of the reception device, are performed by the radar processing device 330 based on the signals received from all of the sensors or from a selection of at least two sensors, using the directivity properties of the array antenna thus formed. The choice of the number of sensors that are used may depend on the frequency band of the signal, the spacing between the sensors, and the desired gain and directivity performance. To determine the position of the targets in the horizontal plane, the multi-sensor antenna may be used as a directional array antenna scanning the horizontal plane, by adjusting the phase and the amplitude of the signals received from each of the sensors and by recombining them so as to orient the antenna beam. Also, the signals received from at least two sensors may be utilized by an interferometry method or by a high-resolution processing operation.

Ideally, the reception device is deployed over a length corresponding to multiple times the half-wavelength at the maximum frequency under consideration, or even several tens of times, and comprises a large number of sensors, in order to increase the gain of the antenna and obtain a very high angular resolution in the horizontal plane.

The detection of the objects and the estimation of their elevation, that is to say the determination of their direction and distance in a vertical plane, are performed using the color properties of the transmitted signals. This determination may be performed based on the signal received from just one of the sensors of the reception device using methods known to those skilled in the art, this having the advantage of being not very complex and inexpensive in terms of computing resources. As an alternative, the determination in the vertical plane may be performed based on the color properties of the signals received by a plurality of sensors, in order to benefit from a processing gain that makes it possible to improve detection performance.

In practice, the detection may be performed sequentially or simultaneously in both planes.

In the same way as the first embodiment, the embodiment of FIG. 3 makes it possible to position the sensors of the receive antenna higher than if the whole radar were to be raised. However, it has the drawback of exhibiting an ambiguity with regard to the front/rear position of the objects detected in the horizontal plane when the radiating elements of the sensors of the receive antenna are omnidirectional in this plane, that is to say that the position is determined to within plus or minus $\pi$, since the antenna pattern is symmetrical about the axis of the receive antenna. This drawback does not occur in the first embodiment, in which the azimuth of the targets is identified through the color properties of the signal and not using the directivity properties of the receive antenna formed by the various reception sensors. Advantageously, in order to remove the uncertainty regarding the direction of the objects in the horizontal plane of the second embodiment, it is possible to deploy means for making the antenna beam directional, such as for example a reflector plane or a dielectric insulator arranged on one side of the antenna in order to block and reflect or attenuate the beam in one half of the horizontal plane. As an alternative, it is possible to use directional radiating elements in order to monitor the horizontal plane only over a horizon less than $\pi$.

Figure 4:
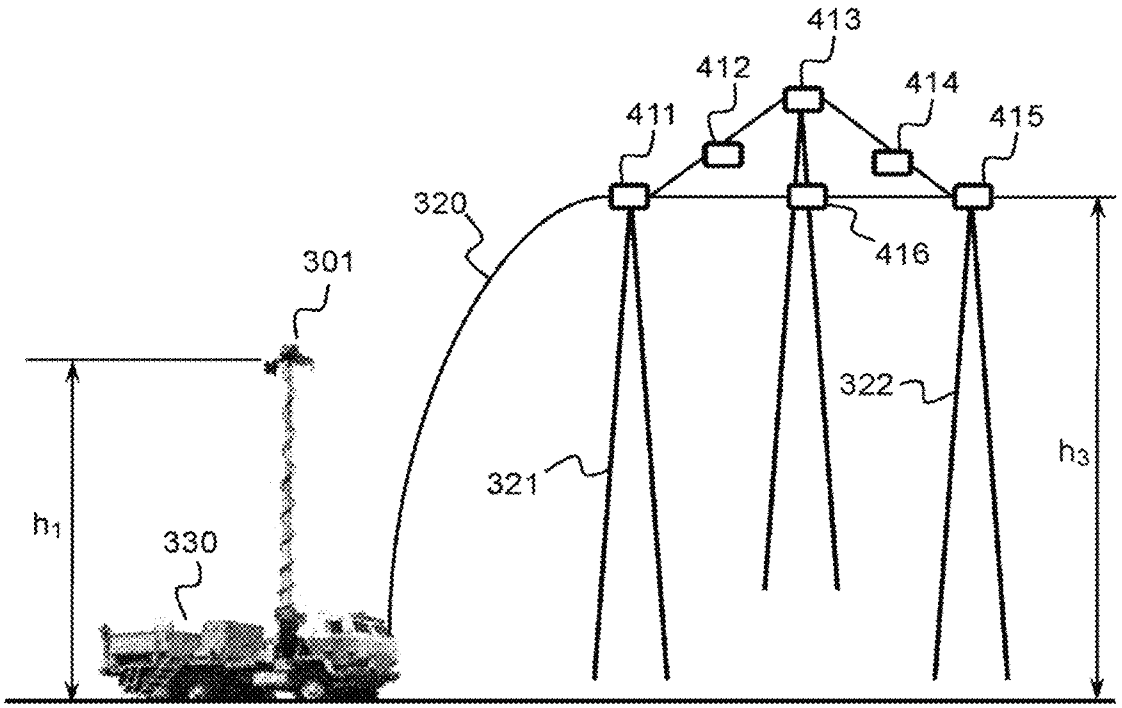
FIG. 4 shows a third embodiment of a system for detecting the presence of objects and for estimating their direction and distance according to the invention.

FIG. 4 shows a third embodiment of a system for detecting the presence of objects and for estimating their direction and distance in three dimensions according to the invention. This differs from the one described in FIG. 3 in that the sensors 411 to 416 of the reception device are no longer arranged in a row, but are arranged so as to form a triangle or any other geometric shape that makes it possible to remove the ambiguity regarding the front/rear direction of arrival in the horizontal plane.

By estimating the direction of arrival in the horizontal plane based on the sensors of each of the branches of the triangle independently, and then by jointly using the three results, it is possible to remove the ambiguity that exists in the device of FIG. 3. In the example of FIG. 4, in which the reception device comprises six sensors, one possible implementation consists in estimating the direction of arrival in the horizontal plane based on the following triplets of sensors: (411, 412, 413), (413, 414, 415), and (415, 416, 411), and then in using the ambiguous position information detected by each triplet to remove the ambiguity regarding the arrival position in the vertical plane. For a given number of sensors, however, this determination leads to a loss in the gain of the antenna in comparison with the embodiment of FIG. 3.

For the rest, the operation of the third embodiment is the same as that of the second operating mode:

- the transmission device 301 transmits signals in a colored manner in the vertical plane,
- the azimuth of the detected objects is determined by independently considering each of the branches of the triangle formed by the sensors, and then by comparing the results in order to remove the ambiguity regarding the direction of the detected objects,
- the elevation of the detected objects is determined based on the signals received from one or more sensors by considering the color of the signals transmitted by the transmission device. This measurement may, if necessary, be confirmed based on the signals received from one or more other sensors.

The processing operations in the horizontal plane and the vertical plane may be performed sequentially or simultaneously, so as to benefit from a processing gain.

The advantages of the second and third embodiments described in FIGS. 3 and 4 over the prior art stem from the separation of the transmission elements and the reception elements. Since the mass of the reception device is low in comparison with that of the transmission device, it may be deployed at height much more easily than if it had been necessary to raise all of the transmission/reception equipment. In addition, the various sensors that form the reception device may be raised independently of one another.

Using an optical fiber to transmit the signals acquired by the various sensors makes it possible to further lighten the reception device.

Finally, using a method of coloring the radar signals transmitted in the vertical plane makes it possible to determine the direction of the objects detected in this plane based on the signals received from the same sensors as in the horizontal plane, and therefore to considerably reduce the number of sensors required to provide three-dimensional detection. As a result, the cost of the antenna and its deployment complexity are reduced, and the sensors may be installed at great heights, thus improving the reception conditions.

The various embodiments of a detection system according to the invention are thus particularly suitable for the three-dimensional monitoring of operational theaters. The flexibility and lightness of the reception device, the ease of deployment of the radar and the possibility of easily adding sensors to the reception device and of selecting the sensors that are used to adapt the gain of the receive antenna and its directivity allow it to have a multi-role capability not offered by the devices according to the prior art.

In addition, the operating frequency of the detection system may be adapted very easily, by selecting a set of sensors from among the sensors of the receive antenna on the basis of their spacings and the desired wavelength. Since the radar processing device is able to select the sensors based on which the detection processing operations are performed, the receive antenna may comprise heterogeneous sensors designed to operate at different frequencies, thereby giving a multi-frequency capability that reinforces the multi-role aspect of the device.

Finally, the radar processing device according to the invention is multi-role since it makes it possible, based on the signals received from the various sensors, to parallelize the implementation of different detection algorithms whose parameters, such as for example the search area, the data integration time or the operating frequency, are adapted to a specific type of target.

The various embodiments described in FIGS. 2 to 4 are given here by way of illustration of some of the embodiments of the invention. They do not in any way limit the scope of the invention, which is defined by the claims, and many adjustments that are obvious to those skilled in the art could be made to the relative arrangement of the various elements, provided that the following principles are complied with:

- Dissociation of the transmission and reception equipment,
- Transmission in a colored manner in one plane, called first plane,
- Implementation of reception by a receive antenna comprising a plurality of sensors arranged in a plane perpendicular to the first plane, each sensor comprising a radiating element that is omnidirectional or non-omnidirectional in the first plane,
- Determination of the direction of arrival in the first plane using the color properties of the signals received from one or more sensors of the receive antenna,
- Determination of the direction of arrival in a plane perpendicular to the first plane using the directivity properties of the multi-sensor receive antenna.

Figure 5A:
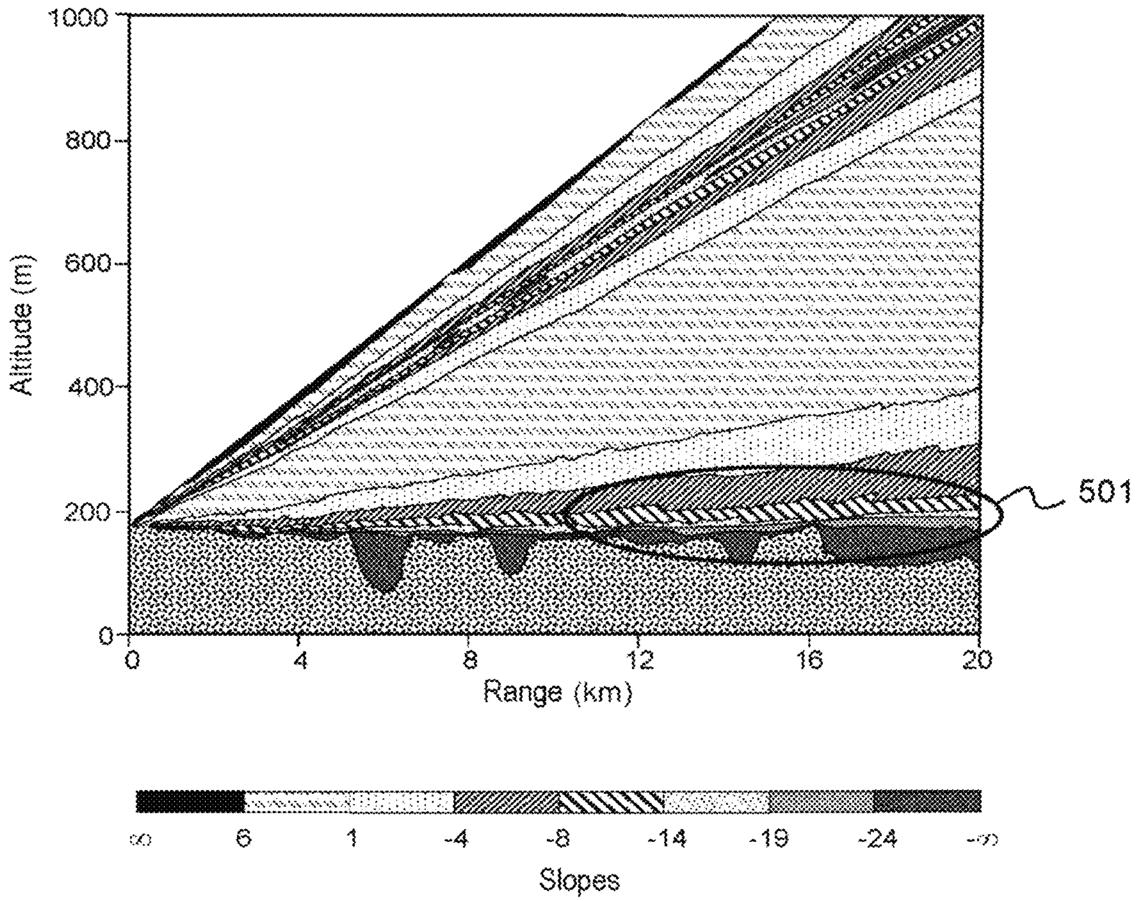
FIG. 5*a* shows the losses linked to interference fringes, for an item of equipment located at ground level.
Figure 5B:
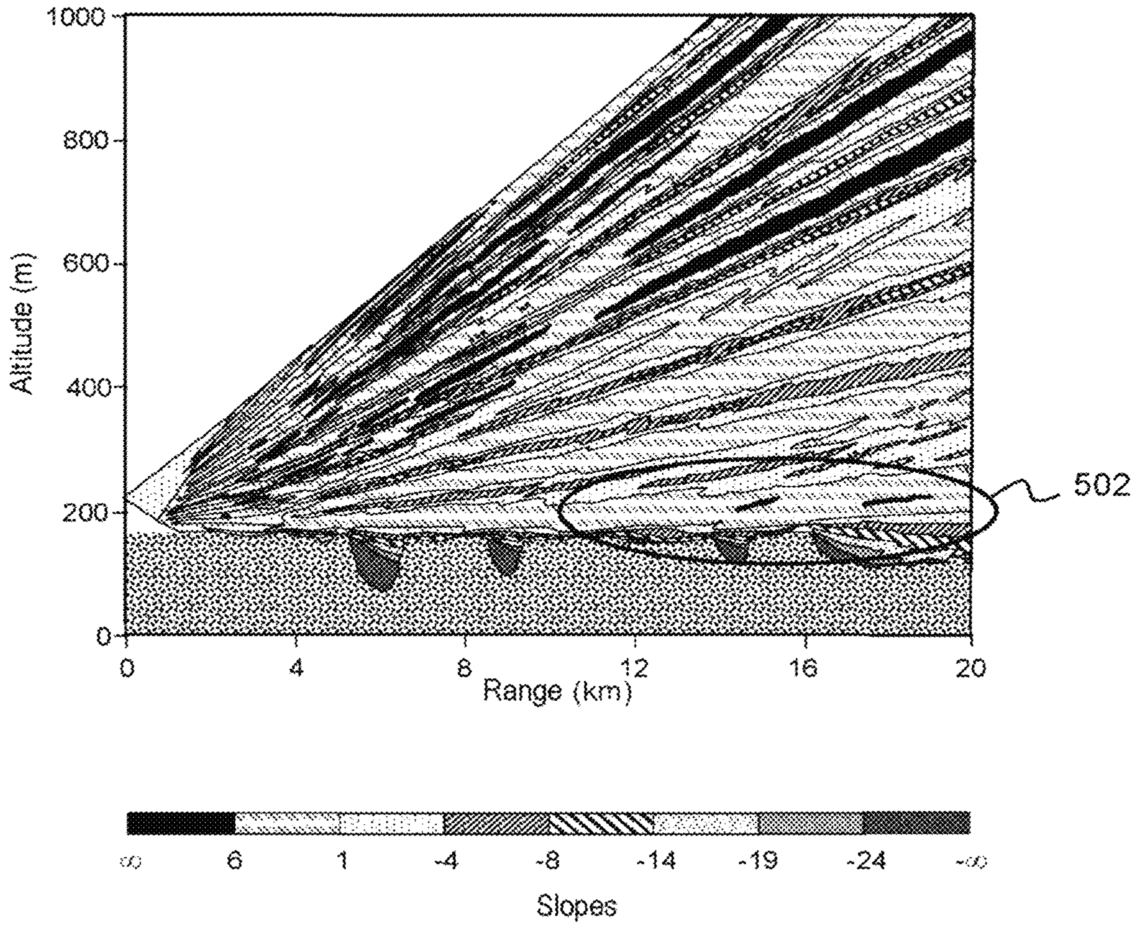
FIG. 5*b* shows the losses linked to interference fringes, for an item of equipment located at a height of 50 meters.
Figure 6:
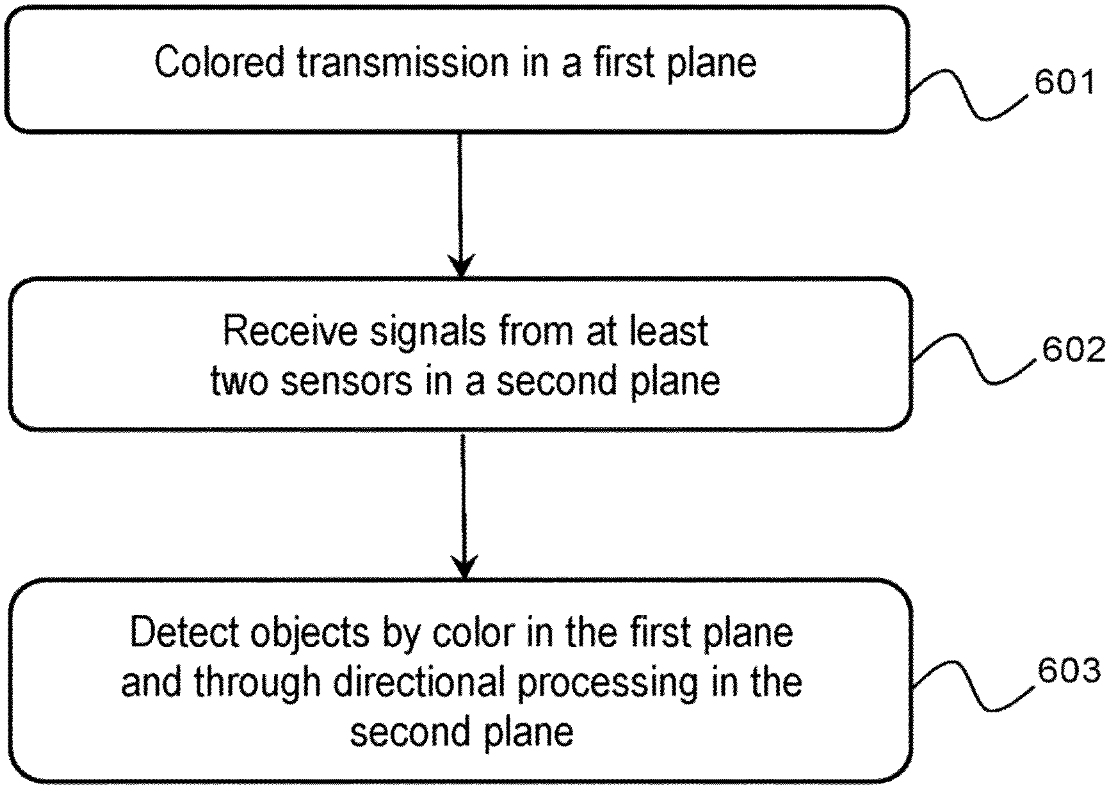
FIG. 6 shows the steps of one embodiment of a method for implementing three-dimensional object detection according to the invention.

FIGS. 5*a* and 5*b* show the losses linked to interference fringes, for an item of equipment located at ground level (FIG. 5*a*) and for an item of equipment placed at a height of 50 meters (FIG. 5*b*). The various fill textures denote the loss levels linked to the interference fringes, as a function of the altitude and the distance of the target.

The interference fringes are linked to the multiple reflections of the signals during propagation thereof, and to the way in which these paths recombine.

It may be seen in FIG. 5*a* that the low-altitude losses for an item of equipment positioned at ground level vary between −8 dB and −14 dB (area 501). It may be seen in FIG. 5*b* that these losses are far lower when the item of equipment is raised (area 502). This phenomenon is explained notably by the fact that the direct path is necessarily more pronounced when the item of equipment is high.

The system according to the invention, in which the device for receiving the radar signals may be raised at a low cost, thus indeed has the effect of significantly reducing the interference fringes to which the signals are subject, and therefore of improving device performance.

The invention also relates to a method for implementing three-dimensional object detection. The method comprises a step 601 of transmitting a signal using a colored transmission method in a first plane, such as for example the horizontal plane for an implementation in a scenario corresponding to FIG. 2, or the vertical plane for FIGS. 3 and 4.

The method comprises a step 602 of receiving signals from at least two sensors arranged in a second plane, perpendicular to the first plane. These sensors may comprise radiating elements that are omnidirectional in the first plane, for 360° coverage in this plane, or radiating elements covering only part of the first plane.

Finally, the method comprises a step 603 of determining the presence of objects and of estimating their direction and distance. This determination is performed in the first plane by utilizing the color properties of the signal received by at least one of the sensors. It is performed in the second plane by utilizing the signals received from at least two of the sensors of the reception device, but the gain of the antenna will be greater the greater the number of sensors under consideration. The received signals may be utilized by implementing an interferometry method or a high-resolution processing operation on the received signals. As an alternative, a directional array antenna may be formed from the various sensors. By varying the direction of the beam from this array antenna, it is possible to scan the space in order to locate the object in the second plane.

The invention claimed is:

1. An object detection system, wherein the object detection system comprises:

- a transmission device transmitting signals using a colored transmission method in a first plane, a transmission direction of said signals in the first plane being coded by a color,
- a reception device comprising at least two sensors arranged in a second plane, the second plane being transverse to the first plane, and
- processing means detecting the presence of an object and estimating:
- a direction and a distance of the object in the first plane based on signals received from at least one of the sensors of the reception device, said processing means using the color of the received signals to estimate the direction and the distance of said object,
- a direction and a distance of the object in the second plane based on signals received from at least two selected sensors of the reception device,
- wherein each sensor comprises a radiating element that covers at least a part of the first plane and wherein the reception device is distant from the transmission device, the reception device being raised with respect to the transmission device, wherein the sensors are interconnected by a link and form a one-dimensional receive antenna array, the sensors being further suspended to a high point such that the sensors are arranged between the ground and a high point, the height of the highest sensor among said sensors being greater than the height at which the transmission device is fixed.

2. The object detection system as claimed in claim 1, wherein each sensor comprises a radiating element that is omnidirectional in the first plane.

3. The object detection system as claimed in claim 1, wherein the sensors of the reception device are connected by a cable and suspended under an airborne device.

4. The object detection system as claimed in claim 1, wherein a single sensor is used to detect the presence of an object and estimate a direction and a distance of said object in the first plane.

5. The object detection system as claimed in claim 1, wherein the sensors of the reception device are connected to the processing means by a fiber-optic link, the sensors furthermore comprising means for converting the received signals to optical signals.

6. The object detection system as claimed in claim 1, wherein the detection of the presence of an object and the estimation of a direction and a distance of said object in the second plane comprises implementing an interferometry method or a high-resolution processing operation on the signals received from the at least two sensors of the receive antenna, or by utilizing the directivity of an array antenna formed by the at least two sensors of the receive antenna.

7. The object detection system as claimed in claim 1, wherein the reception device comprises heterogeneous sensors.

8. The object detection system as claimed in claim 3, wherein the airborne device being an inflatable balloon.

9. The object detection system as claimed in claim 1 wherein the processing means select sensors of the reception device, the selection being based on the spacing between the sensors of the reception device.

10. The object detection system as claimed in claim 1, wherein said selected sensors are determined based on the operating frequency band, the spacing between the sensors, and/or the desired gain and directivity gain of the receive antenna.

11. The object detection system as claimed in claim 1, wherein the reception device is deployed over a length corresponding to multiple times a half-wavelength at a maximum frequency.

12. The object detection estimation system as claimed in claim 1, wherein the first plane is a horizontal plane.

13. The object detection estimation system as claimed in claim 1, wherein the first plane is a vertical plane and the sensors are arranged in a horizontal plane.

14. The object detection estimation system as claimed in claim 13, wherein the sensors are arranged in a row, the system further comprising means for removing ambiguities regarding the position of a detected object with respect to the sensors in the horizontal plane.

15. An object detection method implemented in an object detection system comprising:

a transmission device and a reception device, the reception device being distant from the transmission device and the reception device being raised with respect to the transmission device and comprising at least two sensors, wherein the method comprises the steps of:

- transmitting, by the transmission device, signals using a colored transmission method in a first plane being coded by a color;
- receiving signals, from at least two sensors of the reception device, the sensors of the reception device being arranged in a second plane perpendicular to the first plane, the second plane being transverse to the first plane, wherein each sensor comprises a radiating element that covers at least a part of the first plane, the sensors being interconnected by a link and forming a one-dimensional receive antenna array, the sensors being further suspended to a high point such that the sensors are arranged between the ground and a high point, the height of the highest sensor among said sensors being greater than the height at which the transmission device is fixed;
- determining the presence of an object; and
- estimating:
  - a direction and a distance of the object in the first plane based on signals received from at least one of the sensors of the reception device, using the color of the signals received from said at least two selected sensors of the reception device, and a direction and a distance of the object in the second plane based on the signals received from said at least two selected sensors of the reception device.

16. The object detection method as claimed in claim 15, wherein the method comprises selecting sensors of the reception device, the selection being based on the spacing between the sensors of the reception device.

17. An object detection system, wherein the object detection system comprises:

a transmission device transmitting signals using a colored transmission method in a first plane, a transmission direction of said signals in the first plane being coded by a color, a reception device comprising at least two sensors arranged in a second plane, the second plane being transverse to the first plane, and processing means detecting the presence of an object and estimating:

a direction and a distance of the object in the first plane based on signals received from at least one of the sensors of the reception device, said processing means using the color of the received signals to estimate the direction and the distance of said object, a direction and a distance of the object in the second plane based on signals received from at least two selected sensors of the reception device, wherein the reception device is distant from the transmission device, the reception device being raised with respect to the transmission device, wherein the sensors are interconnected by a link, the interconnected sensors being further suspended to a high point such that the sensors are arranged between the ground and a high point, wherein the first plane is a vertical plane, and the second plane is a horizontal plane, wherein the sensors are arranged to form a triangle, the detection of the presence of an object and the estimation of the direction and the distance of a detected object in the horizontal plane being performed for each branch of the triangle, respectively, and then combined to remove ambiguities regarding the position of the objects with respect to the sensors in the horizontal plane.

* * * * *